(12) United States Patent
Qiu et al.

(10) Patent No.: US 8,462,500 B2
(45) Date of Patent: Jun. 11, 2013

(54) ELECTRONIC DEVICE HAVING HEAT DISSIPATION AIRFLOW PATH

(75) Inventors: Ji-Feng Qiu, Shenzhen (CN); Hong Li, Shenzhen (CN); Xiao-Hui Zhou, Shenzhen (CN); Rui Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 259 days.

(21) Appl. No.: 13/095,942

(22) Filed: Apr. 28, 2011

(65) Prior Publication Data

US 2012/0162911 A1    Jun. 28, 2012

(30) Foreign Application Priority Data

Dec. 28, 2010  (CN) .......................... 2010 1 0609861

(51) Int. Cl.
*H05K 7/20* (2006.01)

(52) U.S. Cl.
USPC ............................ 361/694; 361/689; 361/690

(58) Field of Classification Search
None
See application file for complete search history.

(56) References Cited

U.S. PATENT DOCUMENTS

| | | | | |
|---|---|---|---|---|
| 6,574,099 B2 * | 6/2003 | Lindrose | ................. | 361/679.36 |
| 6,587,419 B1 * | 7/2003 | Aizawa et al. | ................ | 720/650 |
| 6,661,604 B2 * | 12/2003 | Hashizume et al. | ........ | 360/97.19 |
| 6,972,373 B2 * | 12/2005 | Yano et al. | ....................... | 174/66 |
| 8,064,194 B2 * | 11/2011 | Szeremeta | .............. | 361/679.33 |
| 8,365,209 B2 * | 1/2013 | Lee et al. | ....................... | 720/648 |
| 2011/0307911 A1 * | 12/2011 | Yamada et al. | ............... | 720/703 |
| 2011/0310551 A1 * | 12/2011 | Wang | ....................... | 361/679.33 |

* cited by examiner

*Primary Examiner* — Boris Chervinsky
(74) *Attorney, Agent, or Firm* — Altis Law Group, Inc.

(57) ABSTRACT

An exemplary electronic device includes a cover, a circuit board and a driving module both mounted on the bottom cover, an electronic component fixed on the circuit board, and a top cover covering the bottom cover. The driving module has a rotating shaft adapted for supportively driving an optical disk to rotate. The electronic component generates heat during operation. Through holes are defined in the top cover and located at a periphery of the rotating shaft. When the optical disk is mounted on the rotating shaft and driven to rotate by the rotating shaft, air heated by the electronic component in the electronic device can flow out of the top cover via the through holes, and rotation of the optical disk facilitates such airflow.

20 Claims, 5 Drawing Sheets

ELECTRONIC DEVICE HAVING HEAT DISSIPATION AIRFLOW PATH

BACKGROUND

1. Technical Field

The disclosure relates to electronic devices such as consumer electronic devices, and particularly to an electronic device facilitating heat dissipation.

2. Description of Related Art

Nowadays, with the development of electronics technology, an electronic device such as a digital video disc (DVD) player is devised to be much thinner and smaller than before, yet hold many more electronic modules. The electronic modules generate a large amount of heat during operation. The interior space of the electronic device is very limited, and the electronic modules occupy much of that space. This can result in heat generated by the electronic modules accumulating rather than being dissipated in time.

What is needed, therefore, is an electronic device which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
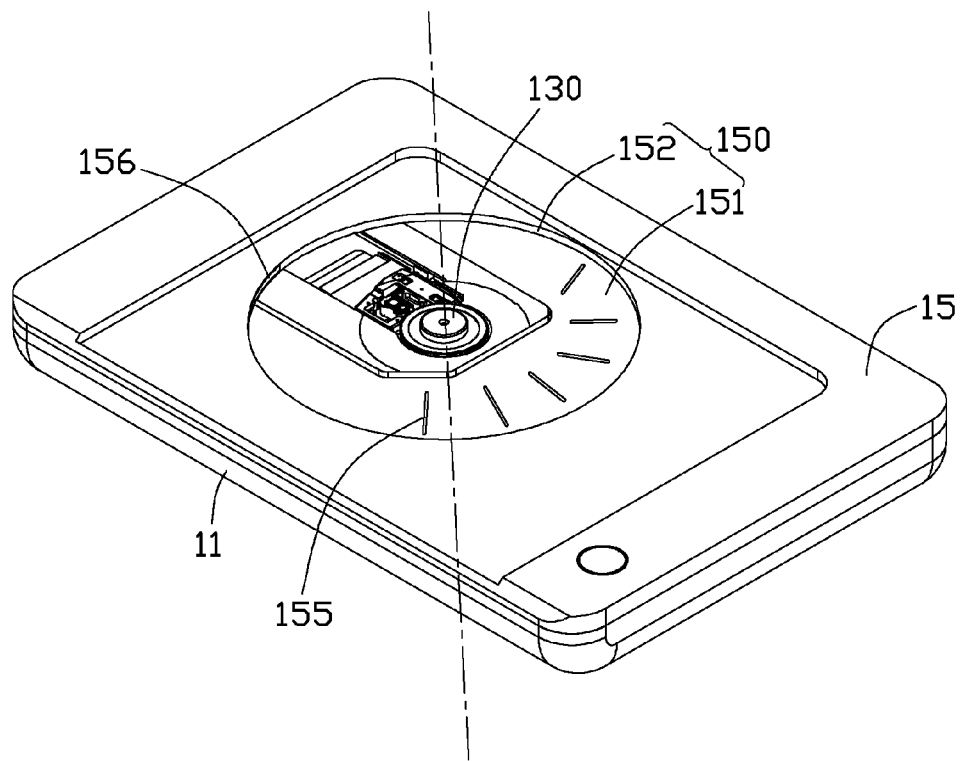
FIG. 1 is an isometric, assembled view of an electronic device in accordance with one embodiment of the disclosure, the electronic device including a top cover.
Figure 2:
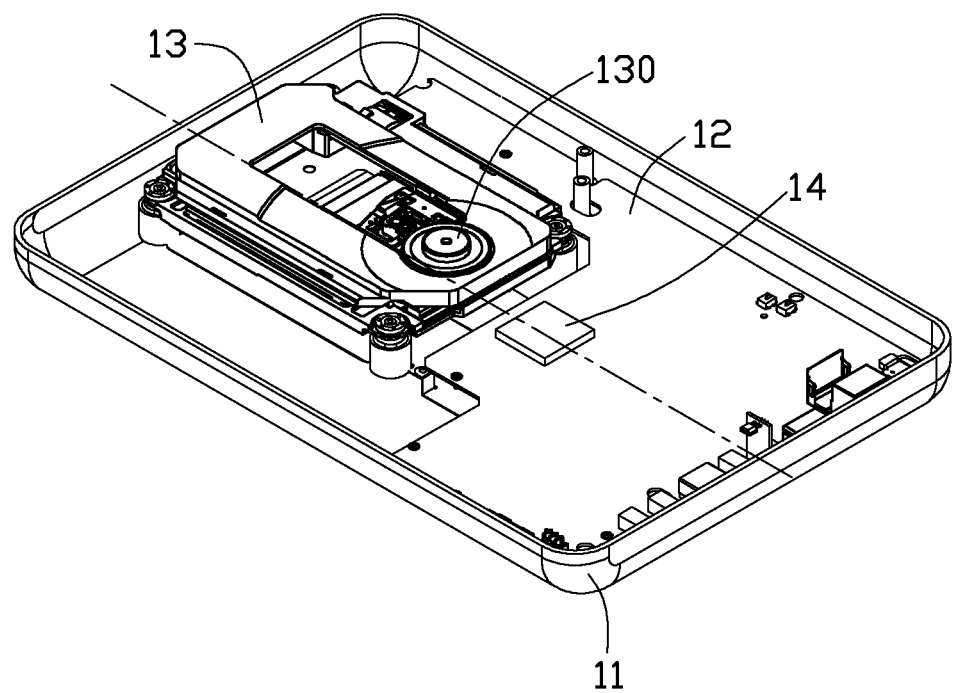
FIG. 2 is similar to FIG. 1, but with the top cover of the electronic device omitted.

Referring to FIGS. 1-2, an electronic device in accordance with an embodiment of the disclosure includes a bottom cover 11, a motherboard 12, a driving module 13, an electronic component 14, and a top cover 15. The top cover 15 and the bottom cover 11 are assembled together and receive the motherboard 12, the driving module 13 and the electronic component 14 therein. The electronic component 14 generates heat during operation, and is arranged on a top side of the motherboard 12 near the driving module 13. In this embodiment, the electronic device is a DVD player.

Figure 3:
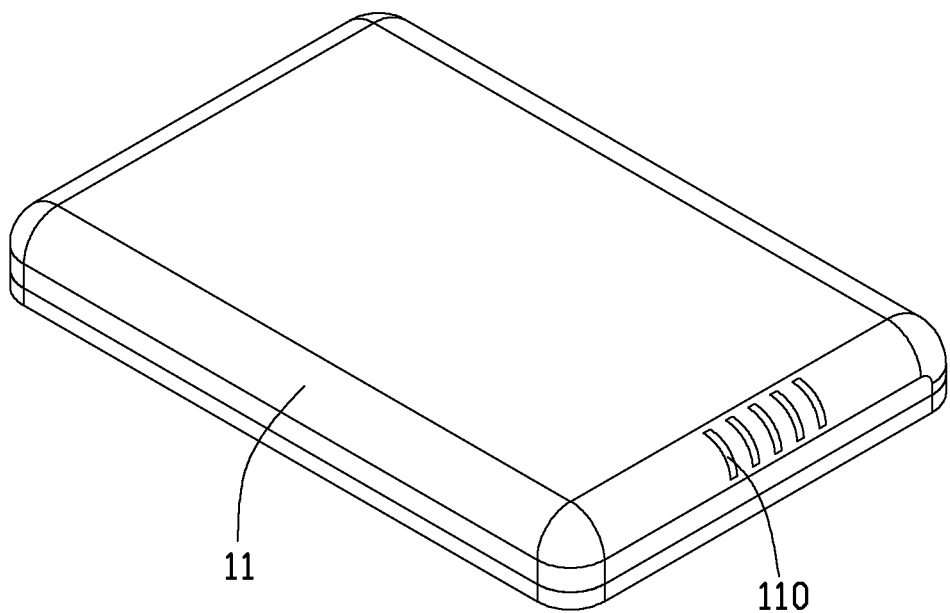
FIG. 3 is a view of the electronic device of FIG. 1, but showing the electronic device inverted.

Also referring to FIG. 3, the bottom cover 11 defines a plurality of ventilation holes 110 in a lateral side thereof. Cooling air of the ambient environment can flow through the ventilation holes 110 into the electronic device. In the illustrated embodiment, the ventilation holes 110 are in the form of elongated through slots, which are parallel to each other and arranged in line. The driving module 13 extends from an opposite lateral side of the bottom cover 11 to a middle of the bottom cover 11. The driving module 13 has a rotating shaft 130, which is located near the middle of the bottom cover 11. The electronic component 14 is located between the rotating shaft 130 and the ventilation holes 110 of the bottom cover 11.

The electronic component 14, the rotating shaft 130, and the ventilation holes 110 are substantially aligned along a longitudinal axis of the bottom cover 11.

Referring back to FIG. 1, a circular depression 150 is inwardly formed at a middle of the top cover 15. A central axis of the depression 150 coincides with a central axis (not shown) of the rotating shaft 130 of the driving module 13. The depression 150 includes a substantially circular bottom wall 151, and a side wall 152 connecting an outer edge of the bottom wall 151 with a top face of the top cover 15.

Figure 4:
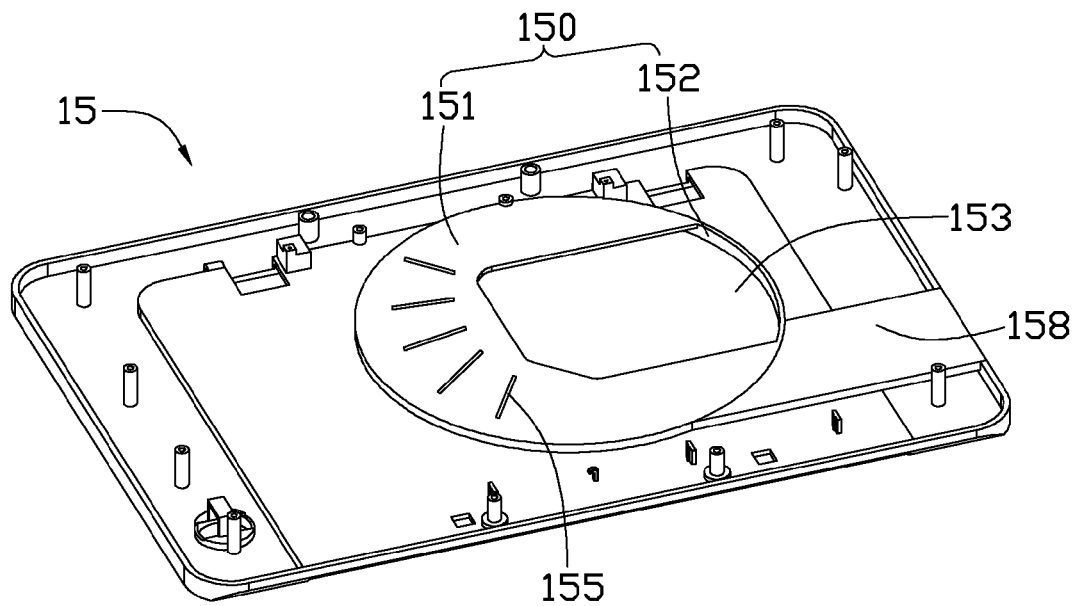
FIG. 4 is an isometric view of the top cover of the electronic device of FIG. 1, but showing the top cover inverted.

Referring also to FIG. 4, the bottom wall 151 of the depression 150 defines a cutout 153 therein, corresponding to the rotating shaft 130 of the driving module 13. A portion of the driving module 13 including the rotating shaft 130 extends through the cutout 153 of the depression 150 into a recess defined by the circular depression 150. A plurality of elongated through holes 155 are defined in a portion of the bottom wall 151 opposite to the portion having the cutout 153. The through holes 155 are located at a periphery of the rotating shaft 130. In the illustrated embodiment, the through holes 155 are in the form of through slots. The through holes 155 extend generally radially outwardly from the periphery of the rotating shaft 130, and are located over the electronic component 14. An air inlet 156 (shown in FIG. 1) is defined in the side wall 152 of the depression 150. The top cover 15 forms an airflow pipe 158 corresponding to the air inlet 156 of the depression 150. The airflow pipe 158 integrally extends from the top cover 15. That is, in the present embodiment, the top cover 15 is a single, monolithic body of the same material. The airflow pipe 158 extends from the air inlet 156 along a tangent direction of the depression 150 to a peripheral sidewall of the top cover 15. At the peripheral sidewall of the top cover 15, the airflow pipe 158 communicates with the ambient environment.

Figure 5:
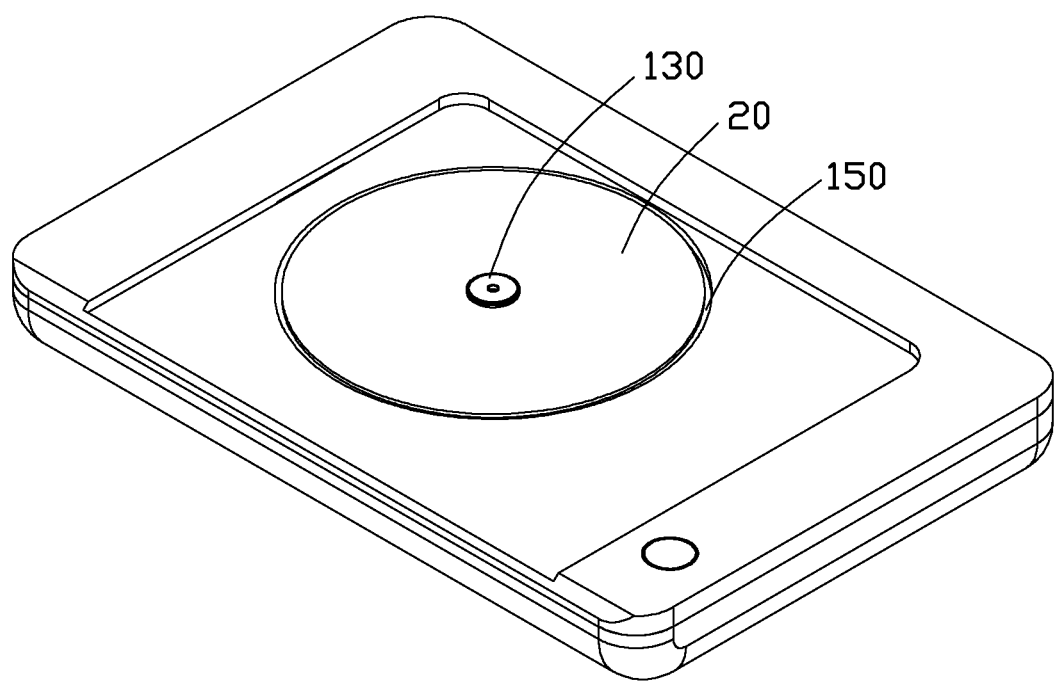
FIG. 5 is similar to FIG. 1, but showing an optical disk engaged on the electronic device.

Also referring to FIG. 5, in use, an optical disk 20 is received in the depression 150 and mounted on the rotating shaft 130. The optical disk 20 is driven to rotate by the rotating shaft 130. Typically, the direction of rotation is clockwise. The electronic component 14 on the motherboard 12 generates heat during operation and heats the air in the electronic device. The air pressure below the depression 150 is greater than the air pressure in the recess of the depression 150 due to the rotating of the optical disk 20. Thus the heated air in the electronic device flows through the through holes 155 and the cutout 153 of the depression 150 and rotates following the rotating of the optical disk 20. When the heated air reaches the air inlet 156 of the depression 150, the heated air flows into and through the airflow pipe 158 to the outside of the top cover 15. Cooling air in the ambient environment can flow through the ventilation holes 110 of the bottom cover 11 simultaneously to compensate the air pressure inside the electronic device. In such manner, the electronic component 14 is cooled efficiently by the rotating of the optical disk 20.

It is believed that the disclosure and its advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device comprising:
   a bottom cover;
   a circuit board mounted on the bottom cover;
   a driving module mounted on the bottom cover and having a rotating shaft adapted for supportively driving an optical disk to rotate;

an electronic component fixed on the circuit board and generating heat during operation; and a top cover covering the bottom cover, the circuit board and at least part of the driving module, a plurality of through holes being defined in the top cover at a periphery of the rotating shaft;

wherein when the optical disk is mounted on the rotating shaft and driven to rotate by the rotating shaft, air heated by the electronic component in the electronic device flows out of the top cover via at least the through holes, and the rotation of the optical disk facilitates such airflow.

2. The electronic device of claim 1, wherein each of the through holes is elongated, the through holes extending generally radially outwardly away from the periphery of the rotating shaft.

3. The electronic device of claim 1, wherein the through holes are located over the electronic component.

4. The electronic device of claim 1, wherein a depression adapted for receiving the optical disk is inwardly formed on the top cover, a central axis of the depression coinciding with a central axis of the rotating shaft of the driving module.

5. The electronic device of claim 4, wherein the depression comprises a bottom wall, and a peripheral side wall connecting an outer edge of the bottom wall with a top surface of the top cover, the through holes being defined in the bottom wall of the depression.

6. The electronic device of claim 5, wherein a cutout is defined in a portion of the bottom wall of the depression opposite to a portion of the bottom wall in which the through holes are defined, the rotating shaft extending up through the cutout and protruding into the depression.

7. The electronic device of claim 5, wherein an air inlet is defined in the side wall of the depression and communicates with the ambient environment of the electronic device.

8. The electronic device of claim 7, wherein the top cover forms an airflow pipe corresponding to the air inlet of the depression, the airflow pipe extending from the air inlet along a tangent direction of the depression and communicating with the ambient environment of the electronic device.

9. The electronic device of claim 8, wherein the airflow pipe integrally extends from the top cover.

10. The electronic device of claim 1, wherein a cutout is defined in a portion of the top cover opposite to a portion of the top cover in which the through holes are defined, the rotating shaft extending up through the cutout and protruding from the top cover.

11. The electronic device of claim 1, wherein the bottom cover defines a plurality of ventilation holes.

12. The electronic device of claim 11, wherein the electronic component is located between the rotating shaft of the driving module and the ventilation holes of the bottom cover.

13. The electronic device of claim 12, wherein the electronic component, the rotating shaft, and the ventilation holes are substantially aligned along a same longitudinal axis of the bottom cover.

14. An electronic device comprising:
a bottom cover defining a plurality of ventilation holes therein;

a motherboard and a driving module both positioned at an inner side of the bottom cover, the driving module having a rotating shaft adapted for driving an optical disk to rotate in a clockwise direction;

a top cover substantially covering the bottom cover, the motherboard and the driving module, a generally circular depression adapted for receiving the optical disk being inwardly formed from the top cover, the depression defining a recess, a plurality of through holes being defined in the circular depression, an airflow pipe being defined in the top cover, the airflow pipe communicating the recess with an outside of the top cover; and an electronic component fixed on the motherboard and generating heat during operation;

wherein air heated by the electronic component in the electronic device flows out of the top cover via the through holes, the recess and the airflow pipe, and rotation of the optical disk facilitates such airflow.

15. The electronic device of claim 14, wherein the airflow pipe extends along a tangent direction of the depression.

16. The electronic device of claim 14, wherein the depression comprises a bottom wall and a side wall connecting an outer edge of the bottom wall with the top cover, the through holes being defined in the bottom wall of the depression.

17. The electronic device of claim 16, wherein a cutout is defined in a side of the bottom wall of the depression opposite to the through holes, the rotating shaft extending through the cutout.

18. The electronic device of claim 16, wherein an air inlet is defined in the side wall of the depression, the airflow pipe extending from the air inlet along a tangent direction of the depression.

19. The electronic device of claim 14, wherein each of the through holes is elongated, the through holes extending generally radially outwardly from the periphery of the rotating shaft.

20. An electronic device comprising:
a bottom cover;
a circuit board mounted on the bottom cover;
a driving module mounted on the bottom cover and having a rotating shaft adapted for supportively driving an optical disk to rotate;
an electronic component fixed on the circuit board and generating heat when operating; and
a top cover substantially covering the bottom cover, the motherboard and the driving module, a generally circular depression adapted for receiving the optical disk being inwardly formed from the top cover, the depression defining a recess, a plurality of through holes being defined in the circular depression, an airflow pipe being defined in the top cover, the airflow pipe extending along a tangent direction of the depression, the airflow pipe communicating the recess with an outside of the top cover;
wherein the through holes, the recess and the airflow pipe cooperatively define an airflow path for air heated by the electronic component to dissipate to the outside of the top cover.

* * * * *